United States Patent [19]
Nishida

[11] Patent Number: 5,844,053
[45] Date of Patent: Dec. 1, 1998

[54] ORGANO-POLYSILOXANE DERIVARTIVES

[75] Inventor: Hirofumi Nishida, Himeji, Japan

[73] Assignee: Nagase-Ciba, Ltd., Japan

[21] Appl. No.: 737,253

[22] PCT Filed: Mar. 14, 1996

[86] PCT No.: PCT/JP96/00649

§ 371 Date: Oct. 29, 1996

§ 102(e) Date: Oct. 29, 1996

[87] PCT Pub. No.: WO96/28496

PCT Pub. Date: Sep. 19, 1996

[30] Foreign Application Priority Data

Mar. 14, 1995 [JP] Japan ................................ 7-081678

[51] Int. Cl.$^6$ ........................................... C08F 283/00
[52] U.S. Cl. ........................... 525/476; 528/25; 528/26; 528/27; 528/28; 528/29; 528/30
[58] Field of Search ................. 525/476; 528/25, 528/26, 27, 28, 29, 30

[56] References Cited

U.S. PATENT DOCUMENTS

| | | | |
|---|---|---|---|
| 3,055,858 | 9/1962 | Frye et al. | 525/476 |
| 3,247,280 | 4/1966 | Kanner | 525/476 |
| 3,539,655 | 11/1970 | Strachan et al. | 528/29 |
| 3,660,434 | 5/1972 | Patterson | 528/29 |
| 4,851,475 | 7/1989 | Federici et al. | 528/29 |

FOREIGN PATENT DOCUMENTS

| | | |
|---|---|---|
| 4292676 | 10/1992 | Japan . |
| 665375 | 3/1994 | Japan . |
| 61185527 | 8/1996 | Japan . |

*Primary Examiner*—Melvyn I. Marquis
*Attorney, Agent, or Firm*—Lorusso & Loud

[57] ABSTRACT

The disclosed organo-polysiloxane derivative is useful as a dispersing agent for homogeneously dispersing a silicone gel in a curable resin such as an epoxy resin. The organo-polysiloxane derivative is prepared by first reacting an organo-polysiloxane compound A having an active hydrogen-containing group in each of its both terminals and having from 5 to 70 siloxane bonds with a bifunctional organic compound B having two functional groups reactable with active hydrogen. The reaction mixture obtained in the first reaction is reacted with a mixture of a bifunctional organic compound C having two active hydrogens and a bifunctional organic compound D having two functional groups reactable with the active hydrogen.

10 Claims, 1 Drawing Sheet

ORGANO-POLYSILOXANE DERIVARTIVES

TECHNICAL BACKGROUND

The present invention relates to an organo-polysiloxane derivative, a process for the preparation thereof, a dispersing agent for dispersing a silicone gel in a curable resin, and a curable resin composition containing the dispersing agent and the silicone gel.

BACKGROUND ART

Epoxy resins are so superior in thermal, mechanical an electrical characteristics that they hitherto have been utilized extensively as adhesives, paints, materials for insulating electrical and electronic parts, materials for sealing electrical and electronic parts, and so on.

For epoxy resins, however, cured articles obtained by curing the epoxy resins present the problem that internal stress may be caused to occur in the cured articles, resulting various problems. For instance, in instances where electronic parts are sealed with an epoxy resin the cured epoxy resin may cause trouble or damage in the electrical and electronic parts sealed by the epoxy resin due to its internal stress.

It has been proposed that silicone gel be added in order to decrease the internal stress of the cured epoxy resin articles (Japanese Patent Unexamined Publication No. 61-185,527). The silicone gel, however, suffers from the disadvantage that it is difficult to disperse in an epoxy resin because it is poor in compatibility with the epoxy resin.

Further, generally speaking, although not limited to the curable epoxy resins, curable resins are likely to cause internal stress when cured. For the curable resins other than the epoxy resins, it is also possible to decrease the internal stress in their cured materials by adding a silicone gel thereto. It has been found difficult, however, to disperse the silicone gel in the curable resins other than the epoxy resins.

The objects of the present invention include the following (1) To provide an organo-polysiloxane derivative useful as a dispersing agent for dispersing a silicone gel in a curable resin homogeneously and a process for the preparation thereof;

(2) To provide a dispersing agent for a silicone gel for dispersing the silicone gel in a curable resin homogeneously; and (3) To provide a curable resin composition containing the silicone gel and the dispersing agent for the silicone gel.

Other objects of the present invention will be understood by the description that follows.

DISCLOSURE OF INVENTION

The present invention provides:

(1) An organo-polysiloxane derivative characterized by having a chemical structure as represented by general formula (1) below in its moiety;

(2) A process for the preparation of the organo-polysiloxane derivative having the chemical structure as represented by general formula (1) below in its moiety, which is characterized by the first reaction step in which an organo-polysiloxane compound A having an active hydrogen-containing group at each of its terminal and having from 5 to 70 siloxane bonds is reacted with a bifunctional organic compound B having two functional groups each reactable with the active hydrogen thereof and by the reaction of the reaction product obtained by the first step with a mixture of a bifunctional organic compound C having two active hydrogen-containing groups with a bifunctional organic compound D having two functional groups each reactable with the active hydrogen;

(3) A dispersing agent for dispersing the silicone gel in a curable resin, characterized by the organo-polysiloxane derivative having the chemical structure as represented by general formula (1) below in its moiety; and (4) A curable resin composition characterized by containing the silicone gel and the organo-polysiloxane derivative having the chemical structure as represented by general formula (1) below in its moiety.

(1)

In the general formula (1),

A denotes the organo-polysiloxane compound A;

B denotes the bifunctional organic compound B;

C denotes the bifunctional organic compound C;

D denotes the bifunctional organic compound D;

n denotes an integer of from 1 to 20, preferably from 1 to 14; and p denotes an integer of from 1 to 20, preferably from 1 to 17.

It is to be noted that the bifunctional organic compound B may be the same as the bifunctional organic compound D. In this case, the general formula (1) may be rewritten as general formula (2) as follows:

(2)

In accordance with the present invention, the organo-polysiloxane derivative having the chemical structure as represented by general formula (1) can be prepared by the two reaction steps as will be described by the reaction formulas as follows:

(First reaction step)

$$A+2B \rightarrow B—A—B \quad (3)$$

(Second reaction step)

In the above general formulas, reference symbols A, B, C, D, n and p have the same meanings as above.

In the organo-polysiloxane compound A to be employed as a raw material in the present invention, the groups containing active hydrogen connected to both terminals may include a hydroxyl group (—OH), a carboxyl group (—COOH), a mercapto group (—SH), an amino group (—NH$_2$), —NHR (where R=a substituent), an amide group (—CONH$_2$) and so on. These active hydrogen-containing groups are connected to the silicone atom (Si) through a connection group. As the connection group in this case, there may be mentioned a divalent aliphatic group, aromatic group or heterocyclic group. In the carbon chain of the aliphatic group, there may be contained a hetero atom such as an oxygen atom, a nitrogen atom, a sulfur atom or the like.

The divalent aliphatic group may be a linear or cyclic alkylene group. As the linear alkylene group, there may be mentioned, for example, an alkylene group having from 1 to 20 carbon atoms, such as, e.g. methylene, ethylene, propylene, butylene, hexylene, octylene, dodecylene, hexadecylene, octadecylene or the like. As the cyclic alkylene (cycloalkylene) group, there may be mentioned, for example, cyclopropylene, cyclobutylene, cyclopentylene, cyclohexylene, cyclohexenylene or the like. These linear or cyclic alkylene groups may contain a double bond. Further, the divalent aliphatic group may include an oxyalkylene group or a polyoxyalkylene group, as represented by general formula —(RO)$_s$— (where reference symbol R denotes a lower alkylene group such as ethylene, propylene, butylene or the like; and reference symbol s denotes an integer of from 1 to 20, preferably from 2 to 10).

As the divalent aromatic group, there may be mentioned, for example, a divalent aromatic group derived from an aromatic compound such as benzene, toluene, xylene, ethylbenzene, methoxybenzene, methoxydiphenyl, cyanobenzene, nitrobenzene, cumene, bisphenylmethane, bisphenylpropane, biphenyl, naphthalene, phenanthrene and the like. As the divalent heterocyclic group, there may be mentioned, for example, a divalent heterocyclic group derived from furan, tetrahydrofuran, pyrrole, thiophene, benzofuran, carbazole, pyridine, piperidine, pyran and quinoline and a derivative thereof with its nucleus provided with a substituent.

The polysiloxane bond may be represented by general formula (5) as follows:

In the above formula, reference symbols X and Y may be a hydrocarbon group or a halogenated hydrocarbon group and one of them may be hydrogen. Reference symbol t may be an integer of from 5 to 90, preferably from 20 to 50, more preferably from 35 to 40, and reference symbol f may be zero or 1 although it is zero in usual case.

As the hydrocarbon group, there may be mentioned, for example, a lower alkyl group having from 1 to 6 carbon atoms such as methyl, ethyl, propyl, butyl, hexyl or the like; an aryl group such as phenyl, tolyl or the like; a lower alkenyl group such as vinyl, allyl, propenyl or the like; an aralkyl group such as benzyl, phenethyl or the like; and a cycloalkyl group such as cyclopentyl, cyclohexyl or the like. As the halogenated hydrocarbon group, there may be mentioned, for example, tetrafluoroethyl, perfluorovinyl, dichlorophenyl, trifluorophenyl, and so on.

In the general formula (5) above, reference symbols X and Y may preferably be methyl group or phenyl group. It is preferred that reference symbol t is set within the scope as defined hereinabove. If it is set larger than the above-defined upper value, on the one hand, it is less preferred because operability of the organo-polysiloxane derivative may become diminished when it is employed as a dispersing agent and, if it is set smaller than the above-defined lower value, on the other hand, it is less preferred because dispersibility of a silicone gel in the curable resin may become lesser.

Some specific examples of the organo-polysiloxane compounds as described hereinabove may be illustrated as follows:

In the above general formula, reference symbol R$^1$ denotes methyl group or phenyl group; reference symbol Z denotes —OH, —COOH, —NH$_2$ or —SH; reference symbol R$_2$ denotes a lower alkylene group; reference symbol t denotes an integer of from 5 to 90, preferably from 20 to 50, more preferably from 35 to 40:

In the above general formula, reference symbol Z denotes —COOH, —NH$_2$ or —SH; and reference symbols R$^1$, R$^2$ and t have the same meanings as above:

In the above general formula, reference symbol Z denotes —COOH, —NH$_2$ or —SH; reference symbol R$^3$ denotes ethylene group or propylene group; reference symbol q denotes an integer of from 1 to 20, preferably from 2 to 10; and reference symbols R$^1$ and t have the same meanings as above.

A variety of the organo-polysiloxane compounds having an active hydrogen-containing group at each of its both terminals may be commercially available. Some of such organo-polysiloxane compounds may be enumerated as follows: For example, trade name "BY16-853" (amino groups at both terminals; amino equivalent: 650), trade name "BY16-853B" (amino groups at both terminals; amino equivalent: 2,200), trade name "BY16-752" (hydroxyphenyl groups at both terminals; OH equivalent: 1,574), trade name "BY16-150B" (hydroxyphenyl groups at both terminals; OH equivalent: 4,500), trade name "BY16-150C" (hydroxyphenyl groups at both terminals; OH equivalent: 10,000), and trade name "BY16-750" (carboxyl groups at both terminals; carboxyl equivalent: 700), each prepared by Toray-Dow Corning Silicone K.K.; trade name "TSL 9346" (amino groups at both terminals; amino equivalent: 250), trade name "TSL 9386" (amino groups at both terminals; amino equivalent: 400), trade name "TSL 9836" (mercapto groups at both terminals; SH equivalent: 260), trade name "TSL 9876" (mercapto groups at both terminals; SH equivalent: 410), trade name "TSL 9846" (mercapto groups at both terminals; SH equivalent: 290), and trade name "TSL 9886" (mercapto groups at both terminals; SH equivalent: 440), each prepared by Toshiba Silicone K.K.; trade name "X-22-161AS" (amino groups at both terminals; amino equivalent: 450), trade name "X-22-161A" (amino groups at both terminals; amino equivalent: 840), trade name "X-22-161B" (amino groups at both terminals; amino equivalent: 1,500), trade name "X-22-161C" (amino groups at both terminals; amino equivalent: 2,300), trade name "X-22-162A" (carboxyl groups at both terminals; carboxyl equivalent: 2,330), trade name "X-22-162C" (carboxyl groups at both terminals; carboxyl equivalent: 920), trade name "X-22-167B" (mercapto groups at both terminals; SH equivalent: 1,670), and trade name "X-22-165B" (hydroxyphenyl groups at both terminals; OH equivalent: 2,000), each prepared by Shin-Etsu Silicone K.K.; trade name "F-204-51" (amino groups at both terminals; amino equivalent: 1,000), and trade name "F-204-52" (amino groups at both terminals; amino equivalent: 3,700), each prepared by Nippon Unicar K.K.

The bifunctional organic compound B having two functional groups reactable with the active hydrogen may be an aliphatic compound, an aromatic compound or a heterocyclic compound. The bifunctional organic compound B may be represented by general formula as follows:

L—R$^4$—L  (9)

In the general formula as described hereinabove, reference symbol R$^4$ denotes a divalent organic group; reference symbol L denotes a functional group reactable with active hydrogen; and R$^4$ denotes a substituent having no active hydrogen, such as an alkoxy group, an alkoxycarbonyl group, an acyl group, a nitro group, a cyano group, and a halogen group.

The divalent organic group R$^4$ may be a divalent aliphatic group, a divalent aromatic group or a divalent heterocyclic group.

The divalent aliphatic group may be a linear or cyclic alkylene group. As the linear alkylene group, there may be mentioned an alkylene group having from 1 to 20, preferably from 1 to 10 carbon atoms. As the cyclic alkylene (cycloalkylene) group, there may be mentioned cyclopropylene, cyclobutylene, cyclopentylene, cyclohexylene, cyclohexenylene and so on. These linear or cyclic alkylene groups may contain a double bond. Further, the divalent aliphatic group may contain a hetero atom, such as oxygen, nitrogen, sulfur or the like, in its carbon chain.

The divalent aromatic group may be represented by the following general formula to be derived from a variety of aromatic compounds:

(i) —Ar— where reference symbol Ar denotes a divalent aromatic group derived from aromatic compounds such as benzene, toluene, xylene, ethylbenzene, methoxybenzene, methoxydiphenyl, cyanobenzene, nitrobenzene, cumene, bisphenylmethane, bisphenylpropane, biphenyl, naphthalene, phenanthrene and so on;

(ii) —R—Ar—R— where reference symbol Ar denotes the divalent aromatic group and reference symbol R denotes a lower alkylene group having from 1 to 6 carbon atoms;

(iii) —RO—Ar—OR— where reference symbol Ar denotes the divalent aromatic group and reference symbol R denotes the lower alkylene group; and (iv) —CH$_2$—[OArOCHOHCH$_2$]$_{m-1}$—OArOCH$_2$—.

where reference symbol Ar denotes the divalent aromatic group and reference symbol m denotes an integer of 1 or 2.

As the divalent heterocyclic group, there may be mentioned a divalent heterocyclic group derived from furan, tetrahydrofuran, pyrrole, thiophene, benzofuran, carbazole, pyridine, piperidine, pyran, quinoline or a derivative having its nucleus substituted.

As the functional group L in the general formula (9) above, there may be mentioned epoxy group, isocyanato group (—NCO), carboxyl group, an ester group, hydroxyl group, a halogen atom and so on.

Some specific examples of the bifunctional organic compounds B may be enumerated as follows:

(i)

where reference symbol R denotes the divalent aliphatic group, the divalent aromatic group or the divalent heterocyclic group and reference symbol m is an integer of 1 or 2;

(ii) OCN—R$^4$—NCO where reference symbol R$^4$ denotes the divalent aliphatic group, the divalent aromatic group or the divalent heterocyclic group;

(iii) HOOC—R—COOH where reference symbol R$^4$ denotes the divalent aliphatic group, the divalent aromatic group or the divalent heterocyclic group;

(iv)

where reference symbol R denotes an aromatic group, such as phenyl group, tolyl group or the like, or a lower alkyl group such as methyl group, ethyl group or the like; and (v) ROOC—R$^4$—COOR where reference symbol R$^4$ denotes the divalent aliphatic group, the divalent aromatic group or the divalent heterocyclic group and reference symbol R denotes the lower alkylene group.

The bifunctional organic compound C having two active hydrogen-containing groups may include an aliphatic compound, an aromatic compound and a heterocyclic compound. The bifunctional organic compound C may be represented by general formula as follows:

H—R$^5$—H  (10)

where reference symbol R$^5$ denotes a divalent organic group and symbol H is intended to mean the active hydrogen contained in the active hydrogen-containing group. As specific examples of reference symbol R$^5$, there may be mentioned the active hydrogen-containing groups enumerated hereinabove for reference symbol R$^4$.

The bifunctional organic compound D having two functional groups reactable with the active hydrogen may include an aliphatic compound, an aromatic compound and a heterocyclic compound. As the specific examples of the bifunctional organic compounds D, there may be mentioned those as enumerated hereinabove for the bifunctional organic compounds B.

The preferred organo-polysiloxane derivatives according to the present invention may be prepared by using, as raw reaction materials, an organo-polysiloxane compound A having from 5 to 90 siloxane bonds (SiO) with active hydrogen-containing groups at both terminals, a bifunctional aromatic epoxy compound B and a divalent phenol compound C. As the organo-polysiloxane compound A, there may be used a compound as represented by the general formula (6), (7) or (8) above.

As the bifunctional aromatic epoxy compounds B, there may be employed compounds as represented by general formula as follows:

(11)

(where reference symbol $Ar^1$ denotes a divalent aromatic group; and reference symbol m denotes an integer of 1 or 2).

As the divalent phenol compounds, there may be employed compounds as represented by general formula as follows:

(12)

(where reference symbol $Ar^2$ denotes a divalent aromatic group).

In the general formula (11) representing the bifunctional aromatic epoxy compounds B, reference symbol $Ar^1$ denotes the divalent aromatic group. It is preferred that the reference symbol $Ar^1$ in this case is a divalent aromatic group derived from a polycyclic aromatic compound, particularly such as bis(phenyl)methane, bis(phenyl)propane, bis(phenyl) ethane, naphthalene, biphenyl, tetrabromobiphenyl and so on. The preferred bifunctional aromatic epoxy compounds B to be employed for the present invention may be a diglycidyl ether of a divalent phenol. As some of specific examples thereof, there may be mentioned, for example, bis(4-hydroxyphenyl)propane diglycidyl ether, bis(4-hydroxy-3,5-dibromophenyl)propane diglycidyl ether, bis(4-hydroxyphenyl)methane diglycidyl ether, bis(4-hydroxyphenyl)ethane diglycidyl ether, resorcinol diglycidyl ether, bis(4-hydroxy-3,5-dimethylphenyl) methane diglycidyl ether, bis(4-hydroxy-3-methylphenyl) propane diglycidyl ether, bis(4-hydroxyphenyl) hexafluoropropane diglycidyl ether, 2,6-naphthalenediol diglycidyl ether, tetrabromobiphenylenediol diglycidyl ether, and so on.

In the general formula (12) representing the divalent phenol compounds, reference symbol $Ar^2$ denotes the divalent aromatic group. It is preferred that the reference symbol $Ar^1$ in this case is a divalent aromatic group derived from the polycyclic aromatic compounds as enumerated for reference symbol $Ar^1$. As some of specific examples of the divalent phenol compounds, there may be mentioned, for example, bis(4-hydroxyphenyl)propane, bis(4-hydroxy-3,5-dibromophenyl)propane, bis(4-hydroxyphenyl)methane, bis (4-hydroxyphenyl)ethane, resorcinol, bis(4-hydroxy-3,5-dimethylphenyl)methane, bis(4-hydroxy-3-methylphenyl) propane, bis(4-hydroxyphenyl)hexafluoropropane, 2,6-naphthalenediol, tetrabromobiphenylenediol, and so on.

For the preparation of the organo-polysiloxane derivatives from the raw reaction materials as described hereinabove, the first reaction step may comprise reacting the organo-polysiloxane compound A having from 5 to 70 siloxane bonds and having at both terminals the active hydrogen-containing group reactable with the epoxy group (hereinafter sometimes referred to simply as compound A) with the bifunctional aromatic epoxy compound B (hereinafter sometimes referred to simply as compound B). The reaction scheme in this case may be represented by general formulas as follows, when the compound as represented by general formula (6) above, where Z=—OH, is employed as the compound A:

(13)

In the above general formulas, reference symbols $R^1$, $R^2$, $Ar^1$, m and t have the same meanings as above and reference symbol B' denotes a group as represented by general formula as follows:

(14)

The above reaction may be carried out preferably in the presence of a catalyst such as a tetraalkyl ammonium salt such as, for example, tetramethyl ammonium chloride, tetraethyl ammonium chloride, tetramethyl ammonium bromide, tetramethyl ammonium iodide, phenyltrimethyl ammonium chloride or the like. The amount of the catalyst to be employed may range from 0.01 to 1% mole, preferably from 0.05 to 0.1% mole, with respect to an epoxy resin. The reaction may be carried out in a liquid state and the reaction temperature may preferably be the temperature at which the reaction mixture be kept in a liquid state and range usually from 80° C. to 140° C., preferably from 100° C. to 120° C. It is further preferred that the reaction temperature is so set as to be elevated gradually as the reaction proceeds. Although the reaction pressure may be ambient pressure, elevated pressure or reduced pressure, ambient pressure is preferred. The bifunctional aromatic epoxy compound B may preferably be employed in the amount of 2 moles or more, preferably 2.1 moles or more, with respect to mole of the organo-polysiloxane compound A.

Then, after the first reaction step has been finished, the reaction is carried out by adding a mixture of the compound C with the compound B to the resulting reaction mixture. The reaction scheme in this case may be represented by general formulas as follows:

(15)

-continued

In the above general formulas, reference symbols $R^1$, $R^2$, $Ar^1$, $Ar^2$, B', m and t have the same meanings as above and reference symbols A, B and C may be represented by general formulas as will be described hereinbelow. Further, in the above general formula, reference symbol n is an integer of from 1 to 14, preferably from 8 to 12, and reference symbol p is an integer of from 1 to 17, preferably from 2 to 5:

A: $-O-\phi-R^2-(SiO)_{t-1}-Si-R^2-\phi-O-$ (16)

(with $R^1$ substituents on Si)

(B): $-CH_2CHCH_2-(OAr^1OCH_2CHCH_2)_{m-1}-OAr^1OCH_2CHCH_2-$ (17)
     $\quad\quad |\quad\quad\quad\quad\quad\quad |\quad\quad\quad\quad\quad\quad |$
     $\quad\quad OH\quad\quad\quad\quad\quad\quad OH\quad\quad\quad\quad\quad\quad OH$
$-Ar^1-OCH_2CH-CH_2-$
$\quad\quad\quad\quad\quad |$
$\quad\quad\quad\quad\quad OH$ C: $-O-Ar^2-O-$ (18)

The reaction may be carried out in the presence or absence of a catalyst. Although the catalyst to be employed in this reaction may be any one that does not promote the reaction of an alcoholic hydroxyl group with the epoxy group to a considerable extent, the catalysts to be employed for the first reaction step may preferably be employed for this reaction. It can be further noted that when the catalyst is employed in the first reaction step, it is not particularly needed to add a catalyst in the second reaction step. The reaction temperature may preferably be the temperature at which the reaction mixture be kept in a liquid state and range usually from 130° C. to 170° C., preferably from 140° C. to 150° C. It is further preferred that the reaction temperature is so set as to be elevated gradually as the reaction advances. Although the reaction pressure may be ambient pressure, elevated pressure or reduced pressure, it is preferred that the reaction is carried out under reduced pressure or under conditions where nitrogen gases pass.

Although the structure of the terminals of the organo-polysiloxane derivative according to the present invention may be represented by the structure in which the compound B or the compound C is connected thereto (i.e. group B' or —O—$Ar^2$—OH), whichever structure is to be taken is determined by the ratio of the compound B and the compound C in the mixture and the compound which is contained in a larger ratio is connected to the terminals thereof. In accordance with the present invention, it is preferred that the compound C is connected to the terminals thereof to yield the organo-polysiloxane derivative having a phenolic hydroxyl group at each terminal thereof.

The other preferred modes of the organo-polysiloxane derivatives according to the present invention may be prepared by using the organo-polysiloxane compound A having from 5 to 90 siloxane bonds (SiO) and an active hydrogen-containing group at each terminal thereof, a diisocyanate compound B and a glycol compound C as raw reaction materials.

As the organo-polysiloxane compounds A, there may be employed those as represented by the general formulas (6), (7) or (8) above.

As the diisocyanate compounds B, there may be employed those as represented by general formula as follows:

$OCN-R^6-NCO$ (19)

(where reference symbol $R^6$ denotes a divalent aromatic group or a divalent aliphatic group).

As the glycol compounds C, there may be employed those as represented by general formula as follows:

$HO-R^7-OH$ (20)

(where reference symbol $R^7$ denotes a divalent aliphatic group).

The diisocyanate compound may include an aromatic diisocyanate compound and an aliphatic diisocyanate compound. As some of specific examples of the diisocyanate compounds, there may be mentioned, for example, phenylene diisocyanate, tolylene diisocyanate, 4,4'-diphenylmethylene diisocyanate, naphthalene diisocyanate, hexamethylene diisocyanate and so on.

As the glycol compounds, there may be mentioned, for example, ethylene glycol, propylene glycol, butylene glycol, hexamethylene glycol, polyethylene glycol, polypropylene glycol, polytetramethylene glycol and so on.

For the preparation of the organo-polysiloxane derivatives from the raw reaction materials as described hereinabove, the first reaction step may comprise the eaction of the organo-polysiloxane compound A with the diisocyanate compound B. The reaction scheme in this case may be represented by general formulas as follows, when the compound as represented by general formula (6) above, where Z=—OH, is employed as the compound A:

In the above general formulas, reference symbols $R^1$, $R^2$, $R^6$, m and t have the same meanings as above and reference symbol B' denotes a group as represented by general formula as follows:

$OCN-R^6-NHCO-$ (22)

Then, after the first reaction step has been finished, the reaction is carried out by adding a mixture of the compound C with the compound B to the resulting reaction mixture. The reaction scheme in this case may be represented by general formulas as follows:

In the above general formulas, reference symbols $R^1$, $R^2$, $R^6$, $R^7$, B', m and t have the same meanings as above and reference symbols A, B and C may be represented by the following general formulas. Further, in the above general formulas, reference symbol n denotes an integer of from 1 to 14, preferably from 8 to 12, and reference symbol p denotes an integer of from 1 to 17, preferably from 2 to 5:

B:  —OCHN—R$^6$—NHCO— (25)

C:  —O—R$^7$—O— (26)

The other preferred modes of the organo-polysiloxane derivatives according to the present invention may be prepared by using the organo-polysiloxane compound A having from 5 to 90 siloxane bonds (SiO) and an active hydrogen-containing group at each terminal thereof, a dicarboxylic acid compound B and a diamino compound C as raw reaction materials.

As the organo-polysiloxane compounds A, there may be employed those as represented by the general formulas (6), (7) r (8) above.

As the dicarboxylic acid compounds B, there may be employed those as represented by general formula as follows:

MOC—R$^8$—COM (27)

(where reference symbol R8 denotes a divalent aromatic group or divalent aliphatic group; and reference symbol M is OH or halogen atom).

As the diamino compounds C, there may be employed those as represented by general formula as follows:

H$_2$N—R$^9$—N$_2$H (28)

(where reference symbol R$^9$ denotes a divalent aromatic group or a divalent aliphatic group).

As the dicarboxylic acid compounds B, there may be mentioned, for example, terephathalic acid, naphthalene dicarboxylic acid, maleic acid, succinic acid, adipic acid, sebacic acid and so on.

As the diamino compounds C, there may be mentioned, for example, phenylene diamine, tolylene diamine, butylene diamine, hexamethylene diamine and so on.

For the preparation of the organo-polysiloxane derivatives from the raw reaction materials as described hereinabove, the first reaction step may comprise the reaction of the organo-polysiloxane compound A with the dicarboxylic acid compound B. The reaction scheme in this case may be represented by general formulas as follows, when the compound as represented by general formula (6) above, where Z=—NH$_2$, is employed as the compound A:

In the above general formulas, reference symbols R$^1$, R$^2$, R$^8$, M, m and t have the same meanings as above and reference symbol B denotes a group as represented by general formula as follows:

MOC—R$^8$—CO— (30)

Then, after the first reaction step has been finished, the reaction is carried out by adding a mixture of the compound C with the compound B to the resulting reaction mixture. The reaction scheme in this case may be represented by general formulas as follows:

In the above general formulas, reference symbols R$^1$, R$^2$, R$^3$, R$^9$, M, B', m and t have the same meanings as above and reference symbols A, B and C may be represented by the following general formulas. Further, in the above general formulas, reference symbol n denotes an integer of from 1 to 14, preferably from 8 to 12, and reference symbol p denotes an integer of from 1 to 17, preferably from 2 to 5:

B:  —OC—R$^8$—CO— (33)
C:  —HN—R$^9$—NH— (34)

The other preferred modes of the organo-polysiloxane derivatives according to the present invention may be prepared by using the organo-polysiloxane compound A having from 5 to 90 siloxane bonds (SiO) and an active hydrogen-containing group at each terminal thereof, a carbonic acid diester compound B and a dihydroxy compound C as raw reaction materials.

As the organo-polysiloxane compounds A, there may be employed those as represented by the general formulas (6), (7) or (8) above.

As the carbonic acid diester compounds B, there may be employed those as represented by general formula as follows:

(where reference symbol R$^{10}$ denotes an aliphatic group or an aromatic group).

As the dihydroxy compounds C, there may be employed those as represented by general formula as follows:

HO—R$^{11}$—OH (36)

(where reference symbol R$^{11}$ denotes a divalent aliphatic group or a divalent aromatic group).

As the carbonic acid diester compounds B, there may be mentioned, for example, dimethyl carbonate, diethyl carbonate, diphenyl carbonate, ditolyl carbonate, and so on.

As the dihydroxy compounds C, there may be mentioned, for example, ethylene glycol, propylene glycol, butylene glycol, catechol, bisphenol A, and so on.

For the preparation of the organo-polysiloxane derivatives from the raw reaction materials as described hereinabove, the first reaction step may comprise the reaction of the organo-polysiloxane compound A with the dicarbonic acid diester compound B. The reaction scheme in this case may be represented by general formulas as follows, when the compound as represented by general formula (6) above, where Z=—OH, is employed as the compound A:

(37)

In the above general formulas, reference symbols $R^1$, $R^2$, $R^{10}$, m and t have the same meanings as above and reference symbol B' denotes a group as represented by general formula as follows:

(38)

Then, after the first reaction step has been finished, the reaction is carried out by adding a mixture of the compound C with the compound B to the resulting reaction mixture. The reaction scheme in this case may be represented by general formulas as follows:

(39)

In the above general formulas, reference symbols $R^1$, $R^2$, $R^{10}$, $R^{11}$, B', m and t have the same meanings as above and reference symbols A, B and C may be represented by the following general formulas. Further, in the above general formulas, reference symbol n denotes an integer of from 1 to 14, preferably from 8 to 12, and reference symbol p denotes an integer of from 1 to 17, preferably from 2 to 5:

(40)

(41)

(42)

The other preferred modes of the organo-polysiloxane derivatives according to the present invention may be prepared by using the organo-polysiloxane compound A having from 5 to 90 siloxane bonds (SiO) and an active hydrogen-containing group at each terminal thereof, a dicarboxylic acid diester compound B and a dihydroxy compound C as raw reaction materials.

As the organo-polysiloxane compounds A, there may be employed those as represented by the general formulas (6), (7) or (8) above.

As the dicarboxylic acid diester compounds B, there may be employed those as represented by general formula as follows:

(43)

(where reference symbol $R^{12}$ denotes a divalent aliphatic group or a divalent aromatic group; and reference symbol $R^{13}$ denotes a lower alkyl group).

As the dihydroxy compounds C, there may be employed those as represented by general formula as follows:

(44)

(where reference symbol $R^{11}$ denotes a divalent aliphatic group or a divalent aromatic group).

As the dicarboxylic acid diester compounds B, there may be mentioned, for example, dimethyl malonate, diethyl malonate, dimethyl adipate, dimethyl sebacate, dimethyl terephathalate, diethyl terephathalate, and so on.

As the dihydroxy compounds C, there may be mentioned, for example, ethylene glycol, propylene glycol, butylene glycol, catechol, bisphenol A, and so on.

For the preparation of the organo-polysiloxane derivatives from the reaction materials as described hereinabove, the first reaction step may comprise the reaction of the organo-polysiloxane compound A with the dicarbonic acid diester compound B. The reaction scheme in this case may be represented by general formulas as follows, when the compound as represented by general formula (6) above, where Z=—OH, is employed as the compound A:

(45)

In the above general formulas, reference symbols $R^1$, $R^2$, $R^{12}$, $R^{13}$, m and t have the same meanings as above and reference symbol B' denotes a group as represented by general formula as follows:

(46)

Then, after the first reaction step has been finished, the reaction is carried out by adding a mixture of the compound C with the compound B to the resulting reaction mixture. The reaction scheme in this case may be represented by general formulas as follows:

(47)

-continued $$+B-A-B-(C-B)_n-C+_p$$

In the above general formulas, reference symbols $R^1$, $R^2$, $R^{12}$, $R^{13}$, $R^{14}$, B', m and t have the same meanings as above and reference symbols A, B and C may be represented by the following general formulas. Further, in the above general formulas, reference symbol n denotes an integer of from 1 to 14, preferably from 8 to 12, and reference symbol p denotes an integer of from 1 to 17, preferably from 2 to 5:

A: (48)

B: $-OC-R^{12}-CO-$ (49)

C: $-O-R^{14}-O-$ (50)

In accordance with the present invention, the organopolysiloxane derivative having the structure as represented by general formula (1) in its moiety (hereinafter referred to sometimes as compound S) is characterized in that the moiety contains a long organo-siloxane chain and a long aromatic ring-containing chain or a long aliphatic chain, and it demonstrates excellent properties as a dispersing agent for dispersing a silicone gel homogeneously in a curable resin.

The internal stress of a cured product prepared by curing a curable resin composition with the silicone gel and the compound S dispersed homogeneously in the curable resin becomes very low due to the action of the silicone gel dispersed homogeneously in the cured product.

The silicone gel to be used for the present invention is known to the art and it is also known that such silicone gel can be prepared by condensation reaction method or addition reaction method. The silicone gel to be employed for the curable resin composition according to the present invention can be prepared by each of the methods.

The silicone gel has a polysiloxane structure and it can be prepared, for example, by reacting a vinyl group-containing organo-polysiloxane with SiH group at the rate of 0.3 group of the former to 0.8 group of the latter in the presence of a platinum-type compound as a catalyst. The processes of the preparation of the silicone gel are described in more detail, for example, in Japanese Patent Unexamined Publication Nos. 54-48,720, 48-17,847 and 45-9,476.

The rate of the silicone gel to the curable resin may range from 1 to 100 parts by weight, preferably from 5 to 50 parts by weight, with respect to 100 parts by weight of the curable resin. It is preferred that the silicone gel is in a form of fine particles having a particle size of 1 mm or smaller, preferably 200 μm or smaller, more preferably ranging from 2 to 0.5 μm. The methods for addition of the silicone gel to the curable resin may include, for example, the method comprising adding the silicone gel in a powdery form to a liquid curable resin and dispersing the former in the latter, the method comprising adding a homogeneous mixture of the silicone gel with a curable resin such as an epoxy resin or the like to the curable resin, and the method comprising carrying out the reaction for the formation of the silicone gel in the curable resin. The compositions having the silicone gel formulated with the curable resin are described in more detail, for example, in Japanese Patent Unexamined Publication No. 61-185,527.

The curable resin may include a thermosetting resin and a photosetting resin. As such resins, there may be mentioned, for example, an epoxy resin, an unsaturated polyester resin, a cyanate ester resin, a melamine resin, a urea resin, a phenol resin, a urethane resin, a diallylphthalate resin, a BT (bismaleimide/triazine resin), and so on. Among the resins as described hereinabove, the epoxy resin is employed most frequently in electrical and electronic field. A detailed description will be made of the epoxy resin.

As the epoxy resin, there may be employed any one having two epoxy groups or more in its moiety and a variety of known epoxy resins in a liquid form or a solid form at ambient temperature may be employed for the present nvention. As the epoxy resins, there may be mentioned, for example, a bisphenol A type epoxy resin, a bisphenol F type epoxy resin, a bisphenol AD type epoxy resin, a bisphenol S type epoxy resin, an alicyclic type epoxy resin, a glycidyl ester type epoxy resin, a glycidyl amine type epoxy resin, a hetero-cyclic type epoxy resin, a polyolefinic type epoxy resin, an iodided type epoxy resin, a tetrahydroxyphenylethane epoxy resin, a phenol novolak type epoxy resin, a cresol novolak type epoxy resin, a dihydroxynaphthalene type epoxy resin, a silicone denatured type epoxy resin, and so on.

The compound S may be formulated with the epoxy resin at the rate of from 10 to 100 parts by weight, preferably from 30 to 50 parts by weight, with respect to 100 parts by weight of the epoxy resin. Further, the rate of the compound S with respect to the silicone gel may range from 10 to 50 parts by weight, preferably from 15 to 30 parts by weight, with respect to 100 parts by weight of the silicone gel.

The epoxy resin composition with the silicone gel and the compound S formulated with the epoxy resin can be cured with a curing agent, thereby yielding a curable composition.

As the curing agent to be employed for the present invention, there may be employed a variety of known curing agents. The such curing agents may include, for example, an amine type curing agent, an acid anhydride type curing agent, an imidazole type curing agent, a polyamide type curing agent, a phenol resin type curing agent, a polyvinylphenol type curing agent, a latent curing agent such as a boron trifluoride amine complex type curing agent, a dicyane diamide type curing agent, an organic acid hydrazide type curing agent, a diaminomaleonitrile type curing agent, a melamine type curing agent, an amide imide type curing agent, a polyamine salt type curing agent, a molecular sieve type curing agent, a ultraviolet curing agent (such as an aromatic diazonium salt, a diallyl iodium salt, a triaryl sulfonium salt, a triaryl cerenium salt and so on), a photosetting agent (such as a polymercaptane, a polysulfide resin). These curing agents are described in more detail, for example, in literature such as New Epoxy Resins, pp. 164–254, published by KK Shokoudo (Japan).

Among the curing agents as described hereinabove, particularly the amine type curing agent and the acid anhydride type curing agent can be employed preferably. As the amine type curing agents, there may be mentioned, for example, an aliphatic polyamine such as diethylene triamine, triethylene tetraamine, tetraethylene pentamine, diethylaminopropyl amine and so on; an alicyclic polyamine such as mencene diamine, isophorone diamine, N-aminoethylpiperazine, bis (4-amino-3-thylcyclohexyl)methane, bis(4-aminocyclohexyl)methane and so on; an aromatic polyamine such as methaxylene diamine, diaminodiphenylmethane, diaminodiphenylsulfone, methaphenylenediamine and so on; a polyamidopolyamine, a dicyane diamide, adipic acid dihydrazide, and so on. As the acid anhydride curing agents, there may be mentioned, for example, a monofunctional acid anhydride such as phthalic anhydride, tetrahydrophthalic anhydride, hexahydrophthalic anhydride, methyltetrahydrophthalic anhydride, methylhexahydrophthalic anhydride, methylnadic anhydride, dodecyl succinic anhydride, succinic anhydride, chlorendic anhydride and so on; a bifunctional acid anhydride such as pyromellitic anhydride, benzophenone tetracarboxylic anhydride, ethylene glycol bis(anhydrotrimate), methylcyclohexene tetracarboxylic anhydride and so on; and an acid anhydride containing a free carboxyl group such as trimellitic anhydride, polyazelaic anhydride and so on.

Generally, together with the acid anhydride type curing agents, a basic cure acceleration agent is used. As the basic cure acceleration agents, there may be mentioned, for example, an aliphatic amine such as tetratrialkylamine, tetramethylguanidine, triethanol amine and so on; an licyclic amine such as piperidine, N,N'-dimethylpiperazine, triethylene diamine and so on; a heterocyclic amine such as pyridine, picoline, 1,8-diazabicyclo[5.4.0]-7-undecene and so on; and an aromatic amine such as benzyldimethyl amine, 2-(dimethylaminomethyl)phenol, 2,4,6-tris(diaminometyl) phenol and so on.

The epoxy resin compositions may be formulated with an accessory ingredient customarily used for conventional epoxy resin compositions, such as a cure accelerator, a curing catalyst, a filler, a fire retardant, a coupling agent, a diluent, a coloring agent, a laser masking agent or the like.

The epoxy resin compositions according to the present invention may be in a liquid or powdery form and cured at ambient temperature or at elevated temperature.

As the organo-polysiloxane derivative according to the present invention contains both of the organo-polysiloxane chain and the aromatic ring-containing chain or the long aliphatic chain, it can advantageously be employed as a dispersing agent for homogeneously dispersing the silicone gel in the curable resin. In other words, as the organo-polysiloxane derivative according to the present invention has the polysiloxane chain having compatibility with the silicone gel and the aromatic ring-containing chain or the aliphatic chain having compatibility with the curable resin, the curable resin composition with the silicone gel homogeneously dispersed therein can be obtained by stirring and mixing the silicone gel with the curable resin in a liquid state, together with the organo-polysiloxane derivative according to the present invention.

The curable resin compositions according to the present invention, containing the silicone gel and the organo-polysiloxane derivative, can provide a cured product having a very low internal stress, when they are cured. The curable resin composition according to the present invention can be applied, particularly as a sealing material for electrical and electronic parts, by taking advantage of its very low internal stress of its cured product.

The curable resin compositions containing the silicone gel and the organo-polysiloxane derivatives according to the present invention may be cured into a cured product having a very low degree of internal stress. The curable resin compositions according to the present invention can advantageously be applied particularly as a sealing material for electrical and electronic parts by taking advantage of the very low degrees of internal stress in their cured products.

Although the curable resin composition according to the present invention may be a composition in a liquid state at ambient temperature, it may also be in a powdery state at ambient temperature. For the preparation of the composition in the powdery state at ambient temperature, the curable resin in a powdery state is molten to yield a molten liquid to which in turn the silicone gel and the organo-polysiloxane derivative according to the present invention are added and which is then mixed, followed by cooling the resulting mixture and allowing it to solidify, and the solidified material was pulverized into powders.

The curable resin compositions according to the present invention can be employed favorably as adhesive, paint, insulating materials for electrical and electronic parts, sealing materials for electrical and electronic parts, and molding materials, like conventional curable resin compositions.

BRIEF DESCRIPTION OF THE DRAWINGS

In FIGS. 1 and 2, reference numeral 1 denotes a cured resin product, reference numeral 2 a steel ring, and reference numeral 3 a strain gauge connection line.

EXAMPLES

A more detailed description will be made of the present invention by way of examples.

Example 1
(Synthesis of dispersing agent A)

Into a flask with a stirrer mounted thereon were placed 100.0 grams of phenol-terminal silicone oil BY16-752 (molecular weight=3,148; number of siloxane bonds t=39; product of Toray-Dow Corning Silicone K.K.), 28.70 grams of bisphenol A diglycidyl ether EXA-850CRP (epoxy equivalent=171; product of Dai-Nippon Ink K.K.), and 0.03 gram of tetramethylammonium chloride as a catalyst, and the mixture was stirred on an oil bath at 100° C. for 5 hours, then at 120° C. for 4 hours and further at 130° C. for 1 hour in order to proceed with reaction. Then, the stirring was stopped, and 71.3 grams of a mixture pre-prepared by dissolving bisphenol A (molecular weight=228) in the equivalent amount of bisphenol A diglycidyl ether EXA-850CRP was added to the flask, followed by stirring at 130° C. for another 1 hour. Thereafter, the pressure within the flask is reduced, followed by stirring at 140° C. for 1 hour and then at 150° C. for another 1 hour, thereby yielding an objective material which were referred to herein as dispersing agent A.

The dispersing agent A was an oily material that was in a liquid state at ambient temperature and that demonstrated a viscosity of 20,000 poises at 25° C. In the dispersing agent A, an average polymerization degree of the bisphenol A diglycidyl ether and the bisphenol A was 4.9 and the weight-average molecular weight was 31,000. It is confirmed by the proton NMR that the dispersing agent A had a polyether structure and an epoxy group at one or both of its terminals.

Example 2
(Synthesis of dispersing agent B)

Into a flask with a stirrer mounted thereon were placed 100.0 grams of phenol-terminal silicone oil BY16-752, 19.0 grams of naphthalene bone-type diglycidyl ether HP-4032D (epoxy equivalent=142; product of Dai-Nippon Ink K.K.), and 0.03 gram of tetramethylammonium chloride as a catalyst, and the mixture was stirred on an oil bath at 100° C. for 5 hours, then at 120° C. for 4 hours and further at 130° C. for 1 hour in order to proceed with reaction. Then, the stirring was stopped, and 81.0 grams of a mixture pre-prepared by dissolving bisphenol A in the equivalent amount of bisphenol A diglycidyl ether HP-4032D was added to the flask, followed by stirring at 130° C. for another 1 hour. Thereafter, the pressure within the flask is reduced, followed by stirring at 140° C. for 1 hour and then at 150° C. for another 1 hour, thereby yielding an objective material which were referred to herein as dispersing agent B.

The dispersing agent B was an oily material that was in a liquid state at ambient temperature and that demonstrated a viscosity of 12,000 poises at 25° C. In the dispersing agent B., an average polymerization degree of the bisphenol A diglycidyl ether and the bisphenol A was 5.6 and the weight-average molecular weight was 25,000. It is confirmed by the proton NMR that the dispersing agent B had a polyether structure and an epoxy group at one or both of its terminals.

Reference Example 1
(Method for dispersing silicone gel into epoxy resin)

In a flask equipped with a high-speed stirrer were placed 120.0 grams of an epoxy resin as a base and 40.0 grams of the dispersing agent A or B prepared above, and the mixture was stirred at a high speed for about 1 hour at 100° C. on an oil bath. Then, 100.0 grams of a formulation TSE3062A (product of Toshiba Silicone K.K.) consisting of a vinyl group-containing silicone and a Pt type catalyst was added to the mixture, and the resulting mixture was allowed to let the silicone dispersed in the resin gel while stirring at a high speed. The stirring continued for about 3 hours, thereby completing the gelling thoroughly to yield a silicone gel-dispersed type epoxy resin.

Example 3

In accordance with Reference Example 1, there were employed bisphenol A type epoxy resin RE-310S (product of Nippon Kayaku K.K.) as the epoxy resin acting as the base and the dispersing agent A as the dispersing agent, thereby yielding a silicone gel-dispersed type epoxy resin. With 100 parts by weight of the resulting silicone gel-dispersed type epoxy resin were mixed 30 parts by weight of methylhexahydrophthalic anhydride HN5500 (product of Hitachi Kasei K.K.) as a curing agent and 1 part by weight of benzylmethylamine (BDMA) as a cure accelerating agent thereby yielding an epoxy resin formulation. Table 1 below shows characteristics of a cured material obtained by curing the resulting epoxy resin formulation.

Example 4

In accordance with Reference Example 1, there were employed bisphenol F type epoxy resin EPC-830LVP (product of Dai-Nippon Ink K.K.) as the epoxy resin acting as the base and the dispersing agent A as the dispersing agent, thereby yielding a silicone gel-dispersed type epoxy resin. With 100 parts by weight of the resulting silicone gel-dispersed type epoxy resin were mixed 33 parts by weight of the HN5500 as a curing agent and 1 part by weight of the BDMA as a cure accelerating agent thereby yielding an epoxy resin formulation. Table 1 below shows characteristics of a cured material obtained by curing the resulting epoxy resin formulation.

Example 5

There were employed naphthalene-bone type epoxy resin HP-4032D (product of Dai-Nippon Ink K.K.) as the epoxy resin acting as the base and the dispersing agent B as the dispersing agent, thereby yielding a silicone gel-dispersed type epoxy resin. With 100 parts by weight of the resulting silicone gel-dispersed type epoxy resin were mixed 39 parts by weight of the HN5500 and 1 part by weight of the BDMA, thereby yielding an epoxy resin formulation. Table 1 below shows characteristics of a cured material obtained by curing the resulting epoxy resin formulation.

Example 6

In accordance with Reference Example 1, there were employed alicyclic epoxy resin CY179 (product of Ciba-Geigy K.K.) as the epoxy resin acting as the base and the dispersing agent B as the dispersing agent, thereby yielding a silicone gel-dispersed type epoxy resin. With 100 parts by weight of the resulting silicone gel-dispersed type epoxy resin were mixed 40 parts by weight of the HN5500 and 1 part by weight of the BDMA, thereby yielding an epoxy resin formulation. Table 1 below shows the characteristics of a cured material obtained by curing the resulting epoxy resin formulation.

Example 7

There were employed trifunctional glycidyl amine ELM-100 (product of Sumitomo Kagaku Kogyo K.K.) as the epoxy resin acting as the base and the dispersing agent B as the dispersing agent, thereby yielding a silicone gel-dispersed type epoxy resin. With 100 parts by weight of the resulting silicone gel-dispersed type epoxy resin were mixed 52 parts by weight of the HN5500 and 1 part by weight of the BDMA, thereby yielding an epoxy resin formulation. Table 1 below shows characteristics of a cured material obtained by curing the resulting epoxy resin formulation.

Comparative Example 1

There were employed EPC-830LVP as the epoxy resin acting as the base and commercially available polyether denatured silicone TSF4452 (product of Toshiba Silicone K.K) as the dispersing agent, thereby yielding a silicone gel-dispersed type epoxy resin. With 100 parts by weight of the resulting silicone gel-dispersed type epoxy resin were mixed 33 parts by weight of the HN5500 and 1 part by weight of the BDMA, thereby yielding an epoxy resin formulation. Table 2 below shows characteristics of a cured material obtained by curing the resulting epoxy resin formulation.

Comparative Example 2

In accordance with Reference Example 1, trials have been made to yield a silicone gel-dispersed type epoxy resin by using an epoxy/silicone adduct compound as a dispersing agent, which was prepared by reacting phenol-terminal silicone oil BY16-752 with EXA-850CRP at the rate of one molecule of the former to two molecules of the latter, and EPC-830LVP as the epoxy resin acting as the base. However, the silicone gel was separated gradually from the resinous ingredient during allowing the reaction mixture to stand after the stirring was stopped. Accordingly, the evaluation of characteristics of the formulation has been terminated.

Comparative Example 3

According to Reference Example 1, trials have been made to yield a silicone gel-dispersed type epoxy resin by using EPC-830LVP as the epoxy resin acting as a base without using any dispersing agent; however, the trials have been stopped because the silicone gel was separated from the resinous ingredient immediately. Accordingly, the evaluation of characteristics of the resulting product has been terminated.

Comparative Example 4

An epoxy resin formulation was prepared by mixing 104 parts by weight of the HN5500 and 1 part by weight of the BDMA per 100 parts by weight of an epoxy resin HP-4032D. Table 3 shows the characteristics of a cured material obtained by curing the resulting epoxy resin formulation.

Comparative Example 5

An epoxy resin formulation was prepared by mixing 118 parts by weight of the HN5500 and 1 part by weight of the BDMA with respect to 100 parts by weight of an epoxy resin HP-4032D. Table 3 shows the characteristics of a cured material obtained by curing the resulting epoxy resin formulation.

Comparative Example 6

An epoxy resin formulation was prepared by mixing 95 parts by weight of the HN5500 and 1 part by weight of the BDMA with respect to 100 parts by weight of commercially available silicone-denatured resin A-20NCL (product of Nippon Yushi K.K.) containing a naphthalene-bone type epoxy resin as a base. Table 3 shows the characteristics of a cured material obtained by curing the resulting epoxy resin formulation.

Comparative Example 7

An epoxy resin formulation was prepared by mixing 80 parts by weight of HP-4032D, 14 parts by weight of epoxy group-containing silicone oil FZ3720 (Nihon Uniker K.K.), 6 parts by weight of epoxy group-containing polyether denatured silicone oil FZ3736 (Nihon Uniker K.K.), 97 parts by weight of the HN5500 and 1 part by weight of the BDMA. Table 3 shows the characteristics of a cured material obtained by curing the resulting epoxy resin formulation.

Comparative Example 8

An epoxy resin formulation was prepared by mixing 100 parts by weight of commercially available silicone-denatured resin EPC-40NCL (Nippon Yushi K.K.) containing bisphenol F type epoxy resin as a base with 83 parts by weight of the HN5500 and 1 part by weight of the BDMA. Table 3 shows the characteristics of a cured material obtained by curing the resulting epoxy resin formulation.

(Method of Evaluation)

The epoxy resin formulation was cured at 100° C. for 1 hour and then at 180° C. for another 1 hour, thereby yielding a cured product that in turn was subjected to evaluation for its characteristics as follows:

(Tg): Measured by the DSC method and Tg was employed as a parameter for thermal resistance.

(Internal stress): A steel was embedded in a cured resin material and a stress to be caused to occur in the cured resin material was measured by the steel ring method*. In a table, the values of the internal stress are shown when measured at −70° C.

*Steel ring method

Figure 1:
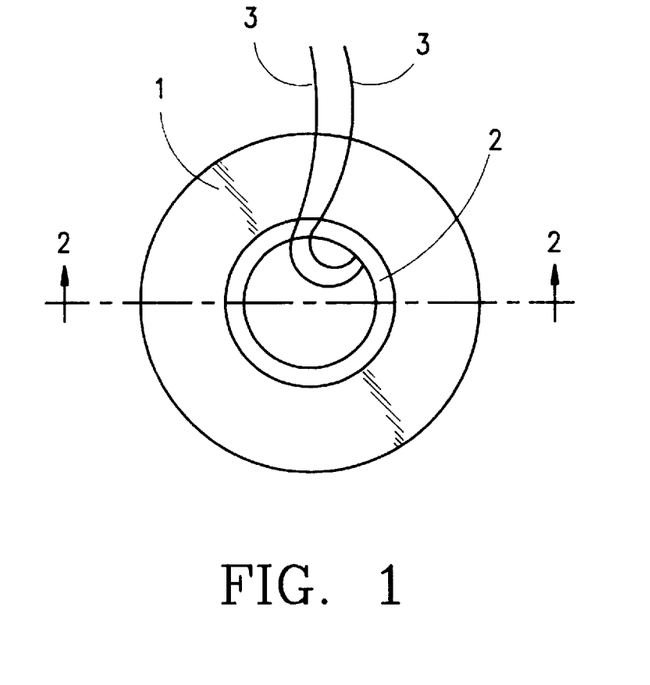
FIG. 1 is a plan view showing a specimen for use in measurement of an internal stress of a cured product by means of steel ring method.
Figure 2:
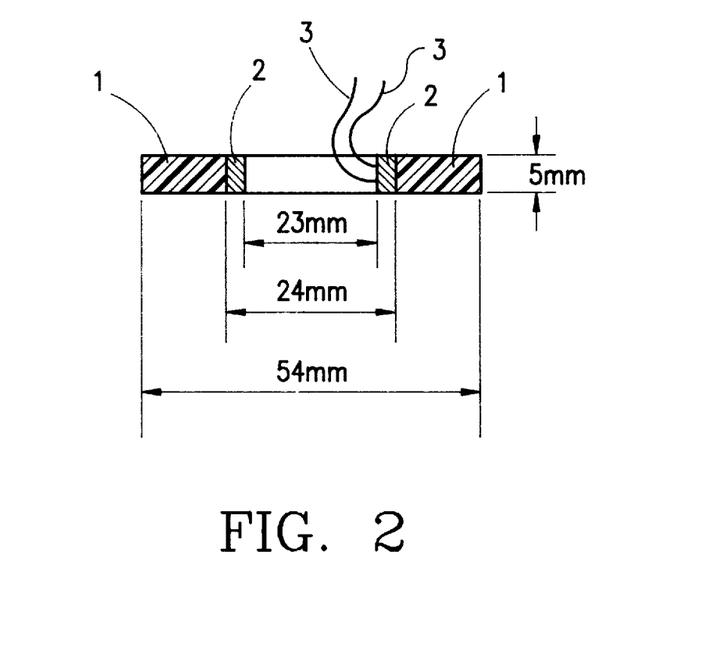
FIG. 2 is a sectional view taken along A—A' line of FIG. 1.

As shown in FIG. 1, a test specimen was prepared by embedding a steel ring in the center of a cured resin material and it was tested by lowering its temperature from 180° C. to −70° C. at the rate of 1 C per minute. The amount of deflection of the steel ring caused to occur by the shrinkage stress of the cured resin material during the decrease in the temperature was read at each of the temperatures with a strain gauge stuck inside the steel ring embedded therein. The internal stress was given as a stress value σ at an optional temperature by inserting the read amount into the following equation:

$$\sigma = E \times d \times (-\epsilon)/r$$

where E is a Young ratio of the steel;
d is a thickness of the steel ring;
r is an inner radius of the steel ring; and is an amount of circumferential deflection of the steel ring.

(Resistance to moisture)

A cured resin material formed in a 50 mm×50 mm×2 mm shape was processed with a pressure cooker test (PCT) (100 hours, 121° C., 2 atmospheric pressure, saturation test) and then tested for dielectric constant at room temperature and 10 KHz, dielectric dissipation factor, and volume specific resistance at 500 V. These characteristics after the moisture processing were used as parameters to moisture resistance.

Further, a water absorption ratio was given by a variation in the weight of the test specimen before and after the pressure cooker test.

TABLE 1

| | EXAMPLES | | | | |
|---|---|---|---|---|---|
| | 3 | 4 | 5 | 6 | 7 |
| SILICONE GEL-DISPERSED TYPE EPOXY RESIN (PARTS/WEIGHT) | | | | | |
| BASE RESIN | RE-310S 120 | EPC-830LVP 120 | HP-4032D 120 | CY179 120 | ELM-100 120 |
| DISPERSING AGENT | A   40 | A   40 | B   40 | B   40 | B   40 |
| SILICONE GEL | TSE3062 200 | TSE3062 200 | TSE3062 200 | TSE3062 200 | TSE3062 200 |
| FORMULATION FOR EVALUATION OF PROPERTIES | | | | | |

TABLE 1-continued

|  | EXAMPLES | | | | |
| --- | --- | --- | --- | --- | --- |
|  | 3 | 4 | 5 | 6 | 7 |
| (PARTS/WEIGHT) | | | | | |
| RESIN | ABOVE RESIN 100 | ABOVE RESIN 100 | ABOVE RESIN 100 | ABOVE RESIN 100 | ABOVE RESIN 100 |
| CURING AGENT | HN5500 30 | HN5500 33 | HN5500 39 | HN5500 40 | HN5500 52 |
| CURE ACCELERATOR | BDMA 1 | BDNA 1 | BDMA 1 | BDMA 1 | BDMA 1 |
| PROPERTIES OF CURED MATERIAL | | | | | |
| Tg (°C.) | 150 | 140 | 160 | 180 | 190 |
| INTERNAL STRESS AT −70° C. (kg/square mm) | 0.33 | 0.25 | 0.24 | 0.77 | 0.45 |
| PROPERTIES AFTER PROCESSING BY PCT FOR 100 h | | | | | |
| DIELECTRIC CONSTANT (10 KHz) | 3.1 | 3.3 | 3.2 | 3.7 | NOT MEASURED |
| DIELECTRIC DISSIPATION FACTOR (10 KHz) | 0.009 | 0.010 | 0.008 | 0.015 | NOT MEASURED |
| VOLUME-SPECIFIC RESISTANCE (Ω-cm, 500 V) | $5.1 \times 10^{14}$ | $4.8 \times 10^{14}$ | $1.2 \times 10^{15}$ | $2.3 \times 10^{14}$ | NOT MEASURED |
| WATER ABSORPTION RATIO (%) | 1.64 | 1.72 | 1.36 | 4.83 | NOT MEASURED |

NOTES:
CURING CONDITIONS 100° C./1 H + 180° C./1 H

TABLE 2

|  | COMPARATIVE EXAMPLES | | | | | |
| --- | --- | --- | --- | --- | --- | --- |
|  | 1 | | 2 | | 3 | |
| SILICONE GEL-DISPERSED TYPE EPOXY RESIN (PARTS/WEIGHT) | | | | | | |
| BASE RESIN | EPC-830LVP | 120 | EPC-830LVP | 120 | EPC-820LV | 120 |
| DISPERSING AGENT | TSF4452 | 40 | EPOXY/SILICONE ADDUCT | 40 | NONE | |
| SILICONE GEL | TSE3062 | 200 | TSE3062 | 200 | TSE3062 | 200 |
| FORMULATION FOR EVALUATION OF PROPERTIES (PARTS/WEIGHT) | | | | | | |
| RESIN | ABOVE RESIN | 100 | — | | — | |
| CURING AGENT | HN550 | 33 | — | | — | |
| CURE ACCELERATOR | BDMA | 1 | — | | — | |
| PROPERTIES OF CURED MATERIAL | | | | | | |
| Tg (°C.) | 140 | | SUSPENDED DUE TO SEPARATION OF SILICONE GEL FROM RESIN | | SUSPENDED DUE TO SEPARATION OF SILICONE GEL FROM RESIN | |
| INTERNAL STRESS AT −70° C. (kg/square mm) | 0.24 | | | | | |
| PROPERTIES AFTER PROCESSING BY PCT 100 h | | | | | | |
| DIELECTRIC CONSTANT (10 KHz) | COULD NOT BE MEASURED | | | | | |
| DIELECTRIC | COULD NOT BE | | | | | |

TABLE 2-continued

|  | COMPARATIVE EXAMPLES | | |
|---|---|---|---|
|  | 1 | 2 | 3 |
| DIS-SIPATION FACTOR (10 KHz) | MEASURED | | |
| VOLUME-SPECIFIC RESISTANCE ($\Omega$-cm, 500 V) | $<1 \times 10^9$ | | |
| WATER ABSORPTION RATIO (%) | ELUTED | | |

NOTES:
CURING CONDITIONS 100° C./1 H + 180° C./1 H

TABLE 3

|  | COMPARATIVE EXAMPLES | | | | |
|---|---|---|---|---|---|
|  | 4 | 5 | 6 | 7 | 8 |
| FORMULATION FOR EVALUATION OF PROPERTIES (PARTS/WEIGHT) | | | | | |
| RESIN | EPC-830LVP | HP-4032D | A-20NCL | EPOXY COMP* | EPC-40NCL |
|  | 100 | 100 | 100 | 100 | 100 |
| CURING AGENT | HN5500 | HN5500 | HN5500 | HN5500 | HN5500 |
|  | 104 | 118 | 95 | 97 | 63 |
| CURE ACCELERATOR | BDMA | BDNA | BDMA | BDMA | BDMA |
|  | 1 | 1 | 1 | 1 | 1 |
| PROPERTIES OF CURED MATERIAL | | | | | |
| Tg (°C.) | 140 | 160 | 155 | 150 | 135 |
| INTERNAL STRESS AT −70° C. (kg/square mm) | 1.39 | 1.52 | 1.26 | 1.10 | 0.82 |
| PROPERTIES AFTER PROCESSING BY PCT 100 h | | | | | |
| DIELECTRIC CONSTANT (10 KHz) | 3.3 | 3.4 | 3.6 | 3.7 | COULD NOT BE MEASURED |
| DIELECTRIC DISSIPATION FACTOR (10 KHz) | 0.011 | 0.013 | 0.031 | 0.038 | COULD NOT BE MEASURED |
| VOLUME-SPECIFIC RESISTANCE ($\Omega$-cm, 500 V) | $3.4 \times 10^{15}$ | $2.3 \times 10^{15}$ | $1.3 \times 10^{15}$ | $1.3 \times 10^{15}$ | $5.2 \times 10^9$ |
| WATER ABSORPTION RATIO (%) | 1.02 | 1.24 | 1.49 | 1.53 | ELUTED |

NOTES:
CURING CONDITIONS: 100° C./1 H + 180° C./1 H
COMP*:
HP-4032D/80 PARTS BY WEIGHT + FZ3720/14 PARTS + FZ3736/6 PARTS
(FZ3720: NIPPON UNIKER K.K.: EPOXY DENATURED SILICONE OIL)
(FZ3736: NIPPON UNIKER K.K.: EPOXY-POLYETHER DENATURED SILICONE OIL)

Example 8

A mixture of 1 part by weight of an organic peroxide type curing agent of an unsaturated polyester resin (trade name "Permeric N"; prepared by Nihon Yushi K.K.), 50 parts by weight of the silicone gel-dispersed type epoxy resin prepared in Example 3, 351 parts by weight of molten silica, 2.2 parts by weight of a vinyl group-containing silane coupling agent (trade name "S210"; prepared by Chisso K.K.) and 1 part by weight of benzyldimethylamine (an agent for curing an epoxy resin) was formulated with an unsaturated polyester resin (trade name "Polylight TE-100"; prepared by Dai-Nippon Ink K.K.), and the resulting formulation was heated at 60° C. for 1 hour and further at 100° C. for another 1 hour, thereby curing the formulation. It was found that the resulting cured formulation gave an internal stress as low as 0.28 kg/mm$^2$ at −50° C.

Example 9

A mixture of 0.14 part by weight of manganese octylate (a curing agent for a cyanate ester resin), 50 parts by weight of the silicone gel-dispersed type epoxy resin prepared in Example 3, 251 parts by weight of molten silica and 2.2 parts by weight of a vinyl group-containing silane coupling agent (trade name "A-187"; prepared by Nippon Uniker K.K.) was formulated with 100 parts by weight of a cyanate ester resin (trade name "Arocy L-10"; prepared by Asahi Chiba K.K.), and the resulting formulation was heated at 100° C. for 1 hour and further at 130° C. for another 1 hour, followed by heating at 180° C. for 3 hours, thereby curing the formulation. It was found that the resulting cured formulation gave an internal stress as low as 0.4 kg/mm² at −40° C.

Example 10
(Synthesis of Dispersing Agent C)

In a flask equipped with a stirrer mounted thereon were placed 100.0 grams of silicone oil BY-752 having phenol groups at its terminals and 15.9 grams of 4,4'-diphenylmethane diisocyanate (MDI), and the mixture was reacted by stirring it for 5 hours at 60° C. on an oil bath. After the stirring was stopped, 22.0 grams of propylene glycol (PG) and 62.6 grams of MDI were added to the mixture in the flask, and the resulting mixture was stirred at 60° C. for 5 hours, followed by reducing the pressure within the flask and then stirring the mixture at 80° C. for 1 hour, thereby yielding an objective material referred to herein as dispersing agent C.

The dispersing agent C was an oily material that was in a liquid state at ambient temperature and that demonstrated a viscosity of 10,000 poises at 25° C. In the dispersing agent C, a polymerization degree was 9.2 and the weight-average molecular weight was 20,000. It is confirmed by the proton NMR that the dispersing agent C had a polyurethane structure and an OH group at one or both of its terminals.

Example 11
(Method for dispersing silicone gel into epoxy resin)

In a flask equipped with a high-speed stirrer mounted thereon were placed 120.0 grams of an epoxy resin as a base and 40.0 grams of the dispersing agent C prepared above, and the mixture was stirred at a high speed for about 1 hour at 80° C. on an oil bath. Then, 100.0 grams of a formulation "TSE3062A" (prepared by Toshiba Silicone K.K.) consisting of a vinyl group-containing silicone and a Pt type catalyst was added to the mixture, and the resulting mixture was allowed to let the silicone dispersed in the resin gel while stirring at a high speed. The stirring was continued for about 3 hours, thereby completing the gelling thoroughly to yield a silicone gel-dispersed type epoxy resin. It was confirmed that the silicone gel was homogeneously dispersed in the epoxy resin by the action of the dispersing agent C.

I claim:

1. An organo-polysiloxane having repeating units of a structure represented by the formula:

wherein A is the residue of an organo-polysiloxane compound containing the unit:

wherein X and Y are each a hydrocarbon group or a halogenated hydrocarbon group, t is an integer of from 5 to 90 and f is zero or 1, and having active hydrogen terminal groups selected from the group consisting of —OH, —COOH, and —SH and connected to a terminal silicon atom through a divalent aliphatic, aromatic or heterocyclic connecting group;

B is the residue of a bifunctional organic compound of the formula L—R⁴—L wherein L is a functional group reactive with said active hydrogen terminal groups and R⁴ is a divalent aromatic group selected from the group consisting of:
(i) —Ar—,
(ii) —R—Ar—R—,
(iii) —RO—Ar—OR—, and
(iv) —CH₂—$_{m-1}$—OArOCH₂— wherein R is a lower alkylene group having from 1 to 6 carbon atoms;
Ar is a divalent aromatic group;
C is the residue of a bifunctional organic compound having two active hydrogen-containing groups; and
D is the residue of a bifunctional organic compound having two active functional groups reactive with said active hydrogen-containing groups; and wherein:
m denotes an integer of 1 or 2; and
p denotes an integer of from 1 to 20.

2. An organo-polysiloxane derivative as claimed in claim 1, where B and D are the same.

3. An organo-polysiloxane derivative as claimed in claim 1 wherein t is an integer of 20 to 50.

4. An organo-polysiloxane derivative as claimed in claim 1 and wherein t is an integer of 35 to 40 and f is zero.

5. A curable resin composition comprising an organo-polysiloxane derivative as claimed in claim 1 and a silicone gel.

6. An organo-polysiloxane having repeating units of a structure represented by the formula:

wherein:

A is the residue of an organo-polysiloxane compound containing 5 to 90 repeating units of the structure:

wherein X and Y are each a hydrocarbon group or a halogenated hydrocarbon group, t is an integer of from 5 to 90 and f is zero or 1, and having active hydrogen terminal groups selected from the group consisting of —OH, —COOH, and —SH and connected to a terminal silicon atom through a divalent aliphatic, aromatic or heterocyclic connecting group;

B is a residue of a bifunctional aromatic epoxy compound of the formula:

wherein Ar¹ is a divalent aromatic group; and m is an integer of 1 or 2;

C is a residue of a divalent phenol compound of the formula:

wherein Ar² is a divalent aromatic group;

m is an integer of 1 or 2 ; and p is an integer of from 1 to 20.

7. A curable resin composition comprising an organo-polysiloxane derivative as claimed in claim 6 and a silicone gel.

8. A process for preparing an organo-polysiloxane derivative comprising:

reacting an organo-polysiloxane compound A having an active hydrogen terminal group at each of its terminal ends with a bifunctional organic compound B having two functional groups which are reactive with said active hydrogen terminal groups to produce an intermediate reaction mixture and then reacting the intermediate reaction mixture with a mixture of a bifunctional organic compound C having two active hydrogen-containing groups and a bifunctional organic compound D having two functional groups each reactive with said active hydrogen-containing groups, wherein:

A is an organo-polysiloxane compound containing 5 to 90 repeating units of the structure:

wherein X and Y are each a hydrocarbon group or a halogenated hydrocarbon group, t is an integer of from 5 to 90 and f is zero or 1, and wherein each of its terminal groups is selected from the group consisting of —OH, —COOH, and —SH and connected to a terminal silicon atom through a divalent aliphatic, aromatic or heterocyclic connecting group;

B is a bifunctional organic compound of the formula L—R$^4$—L wherein L is a functional group reactive with said terminal groups and R$^4$ is a divalent aromatic group selected from the group consisting of:
  (i) —Ar—,
  (ii) —R—Ar—R—,
  (iii) —RO—Ar—OR—, and
  (iv) —CH$_2$—$_{m-1}$—OArOCH$_2$— wherein R is a lower alkylene group having from 1 to 6 carbon atoms and Ar is a divalent aromatic group;

to produce the organo-polysiloxane derivative having a structure represented by the formula:

wherein A', B', C' and D' are residues of the compounds A, B, C and D, respectively;

m is an integer of 1 or 2; and p is an integer of from 1–20.

9. A process for preparing an organo-polysiloxane derivative as claimed in claim 8, wherein B and D are the same compound.

10. A process for preparing an organo-polysiloxane derivative comprising:

reacting an organo-polysiloxane compound A having an active hydrogen terminal group at both of its terminal ends with a bifunctional aromatic epoxy compound which yields the residue B and has two functional groups which are reactive with said terminal groups to produce an intermediate reaction mixture and then reacting the intermediate reaction mixture with a mixture of said bifunctional aromatic epoxy compound and a divalent phenol compound which yields the residue C, wherein:

A is an organo-polysiloxane compound containing 5 to 90 repeating units of the structure:

wherein X and Y are each a hydrocarbon group or a halogenated hydrocarbon group, t is an integer of from 5 to 90 and f is zero or 1, and having active hydrogen terminal groups selected from the group consisting of —OH, —COOH, and —SH and connected to a terminal silicon atom through a divalent aliphatic, aromatic or heterocyclic connecting group;

B is a residue of a bifunctional aromatic epoxy compound which the formula:

wherein Ar$^1$ is a divalent aromatic group; and m is an integer of 1 or 2;

C is a residue of a divalent phenol compound with the formula:

wherein Ar$^2$ is a divalent aromatic group;

to produce the organo-polysiloxane derivative having a structure represented by the formula:

wherein: A' is the residue of the compound A;

n is an integer of from 1–20; and p is an integer of from 1–20.

* * * * *

UNITED STATES PATENT AND TRADEMARK OFFICE
CERTIFICATE OF CORRECTION

PATENT NO. : 5,844,053
DATED : December 1, 1998
INVENTOR(S) : Hirofumi NISHIDA

It is certified that error appears in the above-identified patent and that said Letters Patent is hereby corrected as shown below:

Col. 20, line 42, "IIN5500" should read --HN5500--.

Col. 28, line 12, before "m-1" insert --[OArOCHOHCH$_2$]--.

line 43, before "m-1" insert --[OArOCHOHCH$_2$]--.

Signed and Sealed this

Third Day of August, 1999

Attest:

Q. TODD DICKINSON

*Attesting Officer*   *Acting Commissioner of Patents and Trademarks*